United States Patent
Kumar et al.

(10) Patent No.: US 7,355,668 B2
(45) Date of Patent: Apr. 8, 2008

(54) POLYMER ENHANCED LIQUID CRYSTAL DEVICES BUILT WITH RIGID OR FLEXIBLE SUBSTRATES

(75) Inventors: Satyendra Kumar, Kent, OH (US); Qingbing Wang, Kent, OH (US)

(73) Assignee: Kent State University, Kent, OH (US)

( * ) Notice: Subject to any disclaimer, the term of this patent is extended or adjusted under 35 U.S.C. 154(b) by 650 days.

(21) Appl. No.: 10/443,276

(22) Filed: May 22, 2003

(65) Prior Publication Data

US 2003/0218712 A1 Nov. 27, 2003

Related U.S. Application Data (60) Provisional application No. 60/401,791, filed on Aug. 7, 2002, provisional application No. 60/382,661, filed on May 22, 2002.

(51) Int. Cl.
*G02F 1/1339* (2006.01)

(52) U.S. Cl. ...................................... 349/155

(58) Field of Classification Search ......... 349/155–156
See application file for complete search history.

(56) References Cited

U.S. PATENT DOCUMENTS

| 5,305,127 | A | 4/1994 | Konuma | 359/56 |
|---|---|---|---|---|
| 5,490,001 | A | 2/1996 | Konuma | 359/56 |
| 5,539,545 | A | 7/1996 | Shimizu et al. | 359/51 |
| 5,680,189 | A | 10/1997 | Shimizu et al. | 349/123 |
| 5,739,882 | A | 4/1998 | Shimizu et al. | 349/123 |
| 5,949,508 | A | 9/1999 | Kumar et al. | 349/122 |
| 5,978,064 | A * | 11/1999 | Nishiguchi | 349/156 |
| 6,049,366 | A * | 4/2000 | Hakemi et al. | 349/86 |
| 6,356,324 | B1 * | 3/2002 | Nishiguchi et al. | 349/117 |
| 6,606,142 | B2 * | 8/2003 | Freeman | 349/155 |
| 6,621,548 | B2 * | 9/2003 | Freeman | 349/155 |
| 2002/0109807 | A1 | 8/2002 | Freeman | 349/192 |
| 2003/0002006 | A1 | 1/2003 | Freeman | 349/156 |
| 2003/0076470 | A1 | 4/2003 | Freeman | 349/155 |

FOREIGN PATENT DOCUMENTS

| WO | WO 00/49452 | 8/2000 |
|---|---|---|
| WO | WO 01/18594 | 3/2001 |

* cited by examiner

*Primary Examiner*—Dung T. Nguyen
(74) *Attorney, Agent, or Firm*—Fay Sharpe LLP (57) ABSTRACT

A liquid crystal device comprises of a pair of opposed substrates defining a cell gap. Each substrate has an electrode disposed on a surface facing the other substrate. A plurality of spacers are randomly disposed in the cell gap and extend from one substrate to the other substrate, wherein a polymerization enhancing or initiating compound is not disposed on the surface of the spacers. Polymer columns are randomly disposed between the opposed substrates, extending from one substrate to the other, at least a portion of which are disposed around and immobilize the spacers in the cell gap. A liquid crystal material is disposed in the cell gap. A method for making a liquid crystal device is also provided. The internal columnar structures provide stability against mechanical pressure enabling the fabrication of durable, flexible LC display devices using plastic substrates for applications in portable and handheld devices.

19 Claims, 8 Drawing Sheets

POLYMER ENHANCED LIQUID CRYSTAL DEVICES BUILT WITH RIGID OR FLEXIBLE SUBSTRATES

This application claims priority from U.S. Provisional Patent Application No. 60/382,661 filed May 22, 2002 and U.S. Provisional Patent Application No. 60/401,791 filed Aug. 7, 2002.

BACKGROUND OF THE INVENTION

Traditional liquid crystal displays (LCDs) are built using two glass substrates with conductive but optically transparent indium-tin-oxide electrodes. The electrodes are typically covered with an alignment layer, which anchors the liquid crystal (LC) molecules along a predetermined direction to obtain a specific liquid crystal director (or optic axis) configuration. The optic axis is then manipulated with the help of an applied electric field to change the cell's birefringence and to create different optical transmission states. Flexible LCDs made of plastic substrates have many advantages such as their light weight, small thickness, and flexibility. The biggest challenge related to the construction of flexible devices are spacing (cell gap) control and resistance to mechanical stress.

Traditionally, glass or plastic beads or fibers have been used to maintain uniform cell gap in LCDs that are made with glass substrates. But in LC cells built with flexible plastic substrates, the spacers tend to move around and aggregate, especially when the cell gap is temporarily increased by mechanical deformations, thus causing a loss of spacing control. A change in the cell gap invariably has an adverse impact on the cell's optical characteristics.

Flexible LCDs using plastic substrates can be built using the polymer dispersed LC (PDLC) technology developed by J. Doane et al. in the mid 1980's. However PDLCs have never been used in commercial display products because of their high driving voltage and low multiplexibility.

A method of making an LCD known as the polymer walls method, relies on formation of pure polymer regions in between the pixels. This is accomplished by the application of a "patterned" electric field to cause phase separation of a prepolymer-liquid crystal solution, followed by UV-irradiation to polymerize the segregated polymer regions. The polymer walls provide spacing control and pressure resistance preventing distortion of the displayed image. However, the formation of polymer walls requires patterned electrodes and a high electric field (~18V/µm). This has prevented the technology from being applied in commercial LCDs. Furthermore, it has not been possible to successfully create polymer walls in devices with rubbed alignment layers coated over ITO electrodes.

A LC cell prepared by the phase separated composite film (PSCOF) technology, has a bi-layer structure due to complete anisotropic phase separation of a solution of LC and prepolymer. U.S. Pat. No 5,949,508, the disclosure of which is hereby incorporated by reference, discloses a phase separated composite film. A layer of polymer is formed on the substrate close to the UV source used to initiate phase separation. The LC is expelled from the polymer film to form a uniform layer near the surface of the second substrate. The LC's optic axis is aligned along the rubbing direction, as in conventional devices. Some small areas of the polymer film extend out and bond to the opposite substrate. These bonding sites provide good resistance to mechanical pressure and render it possible to build flexible LCDs on plastic films. However, in such devices only one substrate has an alignment layer to provide anchoring and a pretilt angle.

There have also been other proposed structures for LC devices internally containing liquid crystal and polymer. For example, International Patent Application No. PCT/US00/03866 provides a phase separated composite organic structure which can function in light modulating, beam steering, and focusing elements. The method provides a polymeric material predominantly adjacent to one of the two substrates of the cell and a defined microstructure of low molecular weight organic material primarily adjacent to the other substrate.

Another LC device internally containing polymer and LC is disclosed in U.S. Pat. No. 5,680,189. This patent provides a resin material that is dispersed in a liquid crystal material. The resinous columns are precipitated or deposited out of the liquid crystal to form columns within the cell. However, the use of phase separation of a resin from a liquid crystal in which it is miscible at a given temperature is not provided.

U.S. Pat. No. 5,739,882 provides a LCD that contains polymerized column spacers. In that patent, the column spacers are formed on a modified substrate or otherwise are located in a non-random manner. The columns are also formed from an ultraviolet-curable or heat-curable resin. As with the '189 patent described above, the resin columns are formed by precipitation and not by phase separation, because phase separated resin would have re-dissolved into a liquid crystal upon heating. Additionally, the location of the resin columns may be controlled by modifying the surface of at least one of the substrates.

Electrooptical displays containing internal spacers are also provided by U.S. patent application Publication No. 2002/0109807. In that Patent Application, a parameter that effects either the rate of polymerization of the polymer or the rate of phase separation is adjusted so as to form a first and second layer within the a liquid crystal device. This application also provides a liquid crystal device containing the internal spacers that are coated with a polymer initiation or enhancement (PIE) material. The composition of the LC and the pre-polymer are chosen so that polymer forms around the spacers and is localized to those areas. A liquid crystal cell also may include non-structural polymer initiation or enhancement material. In such a cell, such as one including a mesh-like PIE, the polymer localizes around the PIE and may also extend to one substrate or the other, forming isolated areas of liquid crystal.

In general, it has been difficult to fabricate low cost, highly multiplexed, and flexible displays using the existing methods. Therefore, there is a need for an alternate method of producing a flexible LCD.

BRIEF SUMMARY OF THE INVENTION

It is, therefore, an aspect of the present invention to provide LC devices comprising internal polymer columns, which are lightweight, flexible, and insensitive to mechanical shock and stress. These devices have a unique LC/polymer structure that can be employed to operate LC devices in different modes, such as, Electrically Controlled Birefringence (ECB), Twisted Nematic and Super Twisted Nematic (TN/STN), In-Plane Switch (IPS), and Surface Stabilized Ferroelectric or Anti-ferroelectric LCs (SSFLC/AFLCs).

It is likewise an aspect of the present invention to provide a method of making a LC device that comprises randomly spaced, internal polymer columns.

At least one or more of the foregoing aspects, together with the advantages thereof over the known art relating to LCDs, which shall become apparent from the specification which follows, are accomplished by the invention as herein after described and claimed.

In general, the present invention provides a liquid crystal device comprising a pair of opposed substrates, the opposing surfaces of the substrates defining a cell gap between the opposed substrates, each substrate having an electrode disposed on a surface facing the other substrate; a plurality of spacers randomly disposed in the cell gap and extending from one substrate to the other substrate, wherein a polymerization enhancing or initiating compound is not disposed on the surface of the spacers; polymer columns randomly disposed between the opposed substrates, extending from one substrate to the other substrate, at least a portion of which are disposed around the spacers and immobilizing the spacers in the cell gap; and a liquid crystal material disposed in the cell gap.

The present invention also provides a method for fabricating a light modulating device comprising: providing a pair of substrates with a cell gap therebetween; providing a homogeneous solution of a liquid crystal material and a prepolymer; disposing the solution and a plurality of spacers into the cell gap, wherein the spacers are randomly distributed in the cell gap; inducing phase separation of the mixture to form columns of prepolymer in the cell gap; and polymerizing said columns of prepolymer to form columns of polymer disposed in the cell gap.

DETAILED DESCRIPTION OF THE INVENTION

The present invention relies on the tendency of the LC to phase separate from a mixture of a LC and a prepolymer. The LC and prepolymer may, for example, be miscible in the isotropic phase at high temperature, but immiscible in a liquid crystalline phase at a lower temperature. The formation of polymer columns in the cell may be aided by the relative "wetability" or lack thereof, of the prepolymer and liquid crystal on the surface of the substrates. Upon completion of phase separation and formation of prepolymer columns, the prepolymer can then be polymerized by a chemical, photo-curing, cooling (e.g., thermosets) or other process. An LCD containing randomly spaced internal polymer columns results from the method of this invention.

Figure 1A:
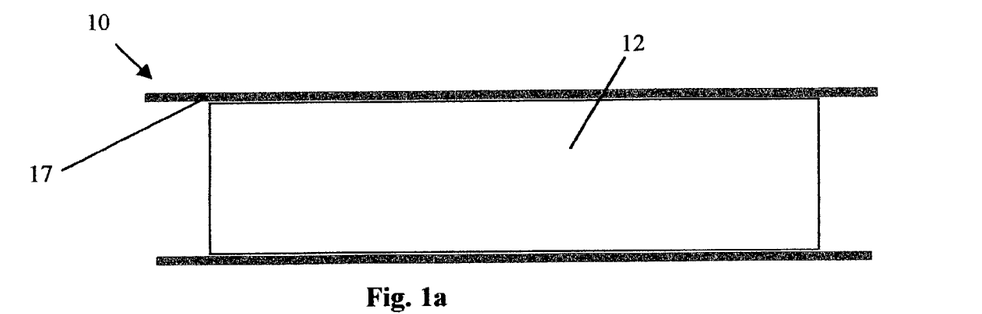
FIG. 1a-1c is a schematic diagram of the wetting behavior of a LC and a prepolymer during phase separation.
Figure 1B:
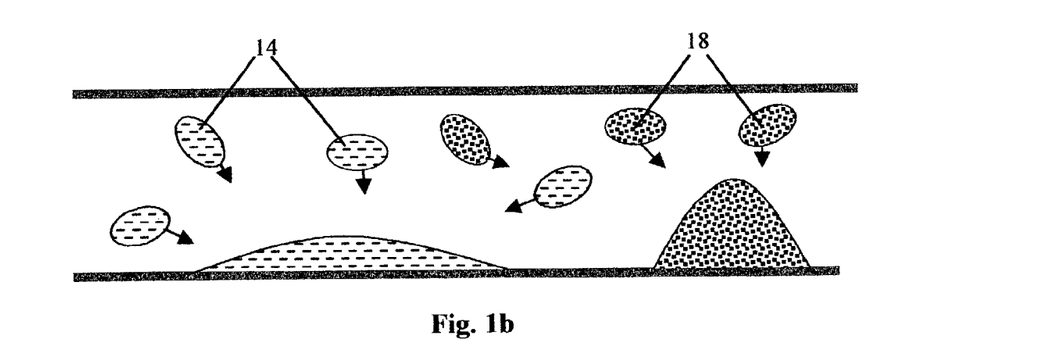
Figure 1C:
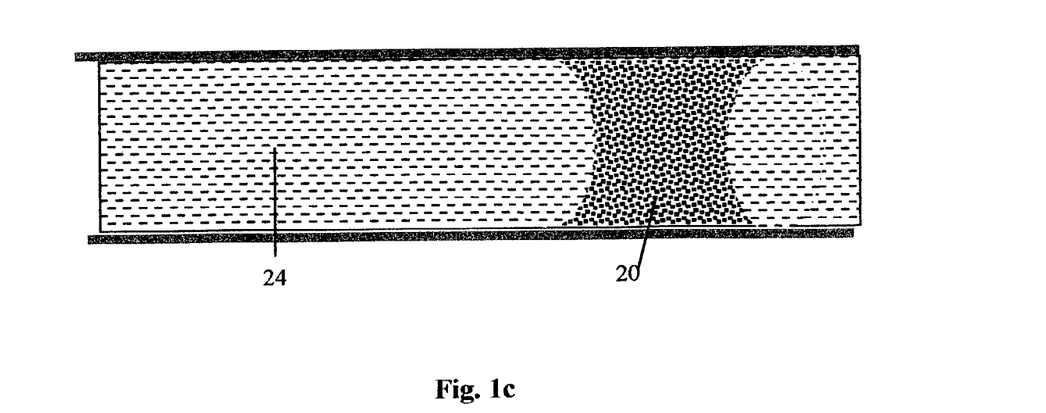
Figure 2:
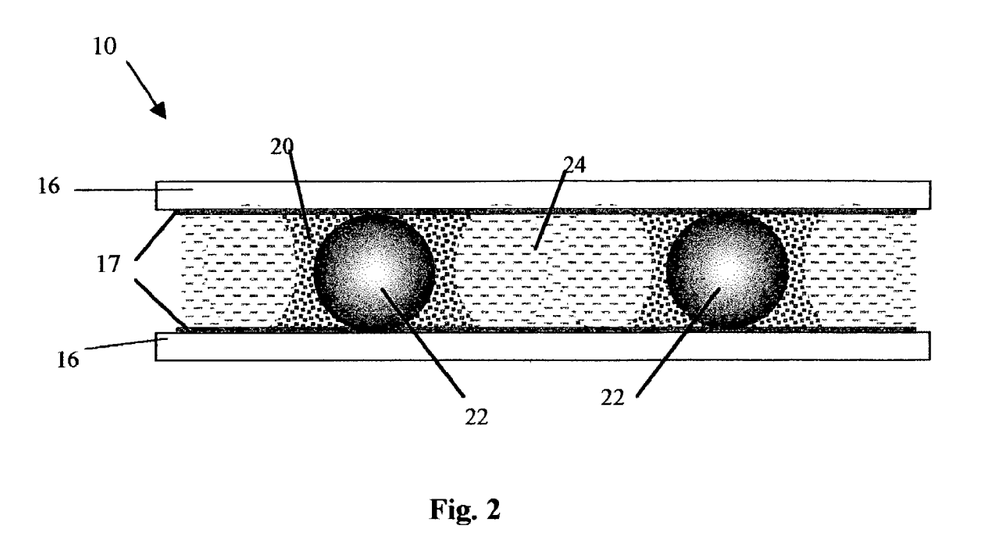
FIG. 2 is a schematic diagram of a polymer enhanced structure according to the present invention.

The method of making the LCD of the present invention may be described with reference to FIGS. 1 and 2. An isotropic mixture of LC and prepolymer is sandwiched between two substrates with transparent electrodes and optionally, specific alignment layers deposited on the electrodes (FIG. 1(a)). Glass fiber or bead spacers may be sprayed or otherwise disposed between the substrates in order to control the initial cell thickness, or mixed in the prepolymer-LC solution. Phase separation of the liquid crystal and prepolymer in the mixture is accomplished by any acceptable mechanism, such as by lowering the temperature from above the clearing temperature to below the clearing temperature, that is, below the temperature above which the LC and the prepolymer are completely miscible. While not wishing to condition patentability on any particular theory, it is believed that the phase separation and formation of columns of prepolymer may be aided or influenced by the polar or non-polar nature of the liquid crystal, prepolymer, and alignment layer material or substrate. A polar molecule is one in which there is an uneven distribution of electrons in the molecule or a section of molecule, creating a positive charge in one portion of the molecule and a negative charge in another portion of the same molecule. For example, the presence of a —$NO_2$ or —CN group would make the molecule polar. A non-polar molecule is one in which the electrons are more or less evenly distributed and there is no significant difference in charge between portions of the molecules. Where a substrate has a polar surface, or has a polar alignment layer or other polar material coated thereon, a polar material will preferentially "wet" the surface. Therefore, a polar liquid crystal material may be utilized when the substrate or surface layer on the substrate is polar. In contradistinction, a non-polar material will tend to phase separate in such a way that contact with the polar surface is minimized. Therefore, when the substrate, alignment layer or other contacting layer is polar, the prepolymer is non-polar. The polar liquid crystal will preferentially wet the surface while the phase separated non-polar prepolymer material will tend to aggregate away from the surface, especially surrounding singularities in the cell gap such as dust particles or spacers. When spacers are present, they may be non-polar material or have a non-polar material layer disposed on their surfaces to provide aggregation foci. When those aggregates are sufficiently large or surround spacers present in the cell gap, they will come in contact with both substrates. The cell is then exposed to conditions which polymerize the prepolymer, such as exposure to UV light, forming polymer columns within the cell. Therefore, it is not necessary to provide a polymerization catalyst, such as a polymerization initiation or enhancing compound, to the cell as a coating on a spacer or other element of the cell. It is also unnecessary to provide a substrate with a modified or patterned surface to control the location of the polymer columns.

A corresponding arrangement of elements is possible when the substrate or surface layer disposed on the substrate is non-polar. In such an arrangement, a non-polar liquid crystal material and a polar prepolymer material are utilized. The non-polar liquid crystal material preferentially wets the surface of the substrate, while the polar prepolymer material aggregates in a way that minimizes contact with the non-polar surface. The phase separated polar prepolymer material will tend to aggregate, especially surrounding the singularities in the cell gap such as dust particles or spacers. When spacers are present, they may be constructed of polar material or have a polar material layer disposed on their surfaces to provide aggregation foci. When those aggregates are sufficiently large or surround spacers present in the cell gap, they will come in contact with both substrates. The cell is then exposed to conditions which polymerize the prepolymer, such as exposure to UV light, forming polymer columns within the cell.

Alignment materials may be selected according to the nature of the prepolymer and LC to be used in the cell. For example, in those cases where a non-polar prepolymer and a polar LC are to be used, the alignment material may contain polar groups in side-chains or main-chains. Polar LCs include E-series LC materials From Merck Co. (such as E7, E48, E31), SL-series LC material from BDH Co. (including BL-001 through BL-032), and ZLI5400-000, ZLI5400-100 (from Merck Co.), Felix-15-000, Felix-15-100 (from Clariant GmbH, Germany) and the like. Non-Polar prepolymers include NOA 60, NOA 61, NOA 63, NOA 65, NOA 68, NOA 71, NOA 72, NOA 73, NOA 77, NOA 81 and NOA 88 (from Norland Products), and n-alkylene acrylates and triacrylate monomers (from Scientific Polymer Products Inc.). Polar alignment layer materials include KJ-01 (chemical structure provided below), polyvinyl alcohol (PVA) and a number of commercially available polyimides such as SEC-610, SE3510, CP7CC3 polyimides (from Nissan Chemical Co.). Conversely, if the prepolymer is a polar material and the LC is non-polar, a non-polar alignment material may be used. Non-Polar LCs include those LC materials without any permanent dipole groups in their molecules structures and have small dielectric constant (both parallel and perpendicular dielectric constant are smaller than 8 and the dielectric anisotropy is smaller than 5), such as MLC-10400-100 (from Merck Co.). Polar prepolymer include polyvinyl alcohol (PVA), polymethyl(metha)acrylates and non-polar alignment layers include most commercially available polyimide materials, such as P12555 (from Dupont Inc.), SE5291 (from Nissan Chemical Inc., Japan) JALS-555 and JALS-598 (from JSR Co., Japan). The presence or absence of polar groups in the LC determines the LC's wetting behavior on the alignment layer and the dynamics of phase separation. In most cases, the LC is polar and the prepolymer or polymer molecules used are non-polar or weakly polar and have poor wetting (or good dewetting) affinity for polar alignment layers. As mentioned above, however, the use of alignment layers in the cell is not required. When an alignment layer is not present, the phase separation of the prepolymer and LC may be influenced by the polar or non-polar nature of the substrate and/or the transparent electrode.

The liquid crystal/prepolymer mixture may generally comprise between about 1 weight percent and about 30 weight percent prepolymer. In one example, the liquid crystal/prepolymer mixture comprises between about 7 weight percent and about 15 weight percent prepolymer. In one particular example, the weight ratio of prepolymer to liquid crystal is about 10:90.

Phase separation may be accomplished by any method which does not interfere with the transmission properties of the LCD cell. One preferred method of inducing phase separation is cooling the prepolymer/LC solution from a temperature above the clearing point of the prepolymer/LC solution to a temperature well below the clearing point, as shown schematically in FIGS. 1 and 2. As mentioned above, the clearing point is the temperature at which the prepolymer and liquid crystal are completely miscible and the entire solution remains in an isotropic state. Typically, a prepolymer/LC solution (12) is heated to at least about 80° C., deposited or filled into a cell (10) that is also heated to at least about 80° C., as shown schematically in FIG. 1a, and the solution is slowly cooled to about room temperature, as shown in FIG. 1b. The temperature of the cell and the solution should be kept at 80° C. or above during the whole filling process, to make sure the prepolymer/LC solution (12) stays in the isotropic state and to prevent any phase separation from occurring. During the cooling, the LC separates from the isotropic solution into micro-droplets (14). These micro-droplets wet the substrates (16) or the alignment layers (17) on the substrates (FIG. 1b). In one example, the cell and solution are cooled by a temperature controller at the rate of about 3° C. per minute. By the end of the phase separation, the LC droplets merge into each other to form a nearly continuous medium (24) while the prepolymer remains as droplets (18) due to its poor wetting property on the polar alignment layers. Some prepolymer droplets will form around or migrate to singularities in the cell such as defects or dust particles, or around the spacers (22), particularly when glass spacers are used with a non-polar prepolymer. Because of the nearly non-polar nature of the glass surfaces, the non-polar pre-polymer will tend to aggregate adjacent to the spacers. When the sizes of the prepolymer droplets become big enough, they can simultaneous touch both substrates (FIG. 1c). The prepolymer droplets, which resemble columns (20), can be polymerized by UV exposure for example, to solidify them, yielding the LC cell shown in FIG. 2.

This unique LC/polymer configuration can greatly enhance electro-optical performance and the stability of flexible plastic LC displays by holding fiber or bead spacers in their position to prevent loss of cell-gap control, providing physical support to the substrates against external stress and mechanical shock, and internally bonding flexible plastic substrates together and preventing the cell thickness from increasing and spacers from moving during bending.

The sizes as well as the distribution of the polymer structures/columns can be easily controlled by changing the polymer concentration, the rate of phase separation, distribution of glass spacers initially sprayed and material properties of LC and prepolymer, to realize the optimization of spacing control.

To demonstrate the effectiveness of the present invention, the following examples are presented. These examples should be understood as being representative examples and the present invention is not limited thereto. The claims will define the invention.

A cell can be constructed with 2 sheets of plastic substrates with little or no birefringence to improve the optical qualities of the final devices. The substrates are coated with a thin layer of conductive material, typically indium tin oxide (ITO), to form conductive electrodes. The ITO can be etched using various methods to form desired patterns.

A polyimide (PI) solution with polar groups in its main chain or side-chain, such as KJ-01, shown as formula I, is coated (by spin coating or printing) onto the ITO side of the substrates as alignment layers. The PI layers are baked at a desired temperature and then rubbed to align liquid crystal in a desired direction.

(I)

A LC/prepolymer solution of nematic LC ZLI5400-100 and prepolymer NOA77 at a ratio of 93:7 by weight was made. Also, 0.6 weight percent of a chiral material (S811, from Merck Co.,) was added into the solution to induce desired twist of LC to fabricate a super twisted nematic (STN) device. The empty cell was constructed by setting a 200° angle between rubbing directions on the substrates and with the cell gap of approximately of 5 microns (5 μm). The solution was filled into the empty cell at the temperature of 80° C. and cooled at the rate of 2° C./min. The cell then was irradiated with a UV light at room temperature for 15 minutes.

Figure 3:
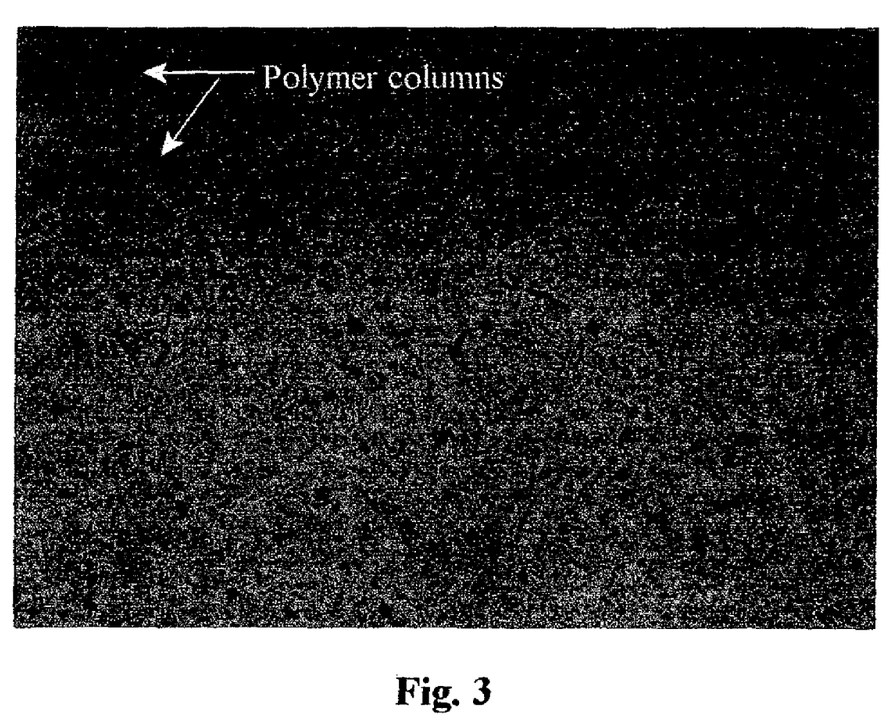
FIG. 3 is a photomicrograph showing the microscopic texture of a polymer enhanced STN LC cell under crossed polarizers.

The resulting device has polymer enhanced structures for flexible multiplexed displays using a passive matrix addressing scheme. FIG. 3 shows a photomicrograph of a polymer enhanced STN LC cell with 200° twist angle. The black dots distributed throughout the texture are solidified polymer columns, which greatly improve the spacing control and mechanical ruggedness of the device.

Figure 4:
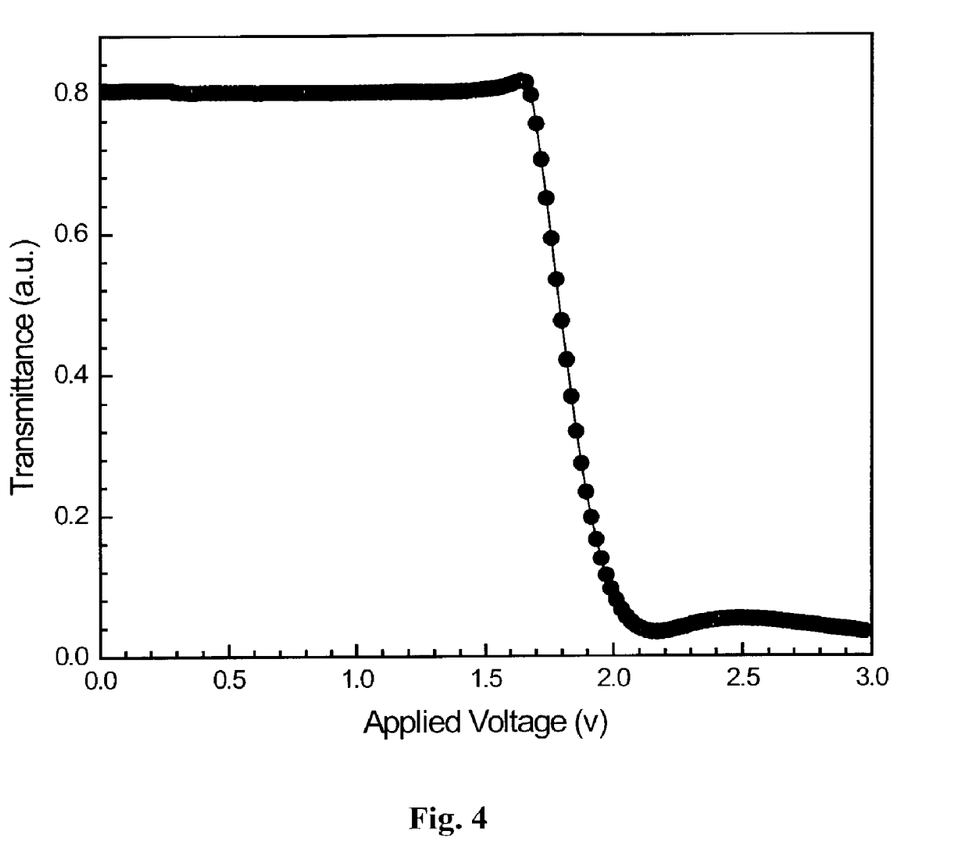
FIG. 4 is a graph showing the transmittance-voltage characteristic curve of a polymer enhanced STN LCD according to the present invention.

FIG. 4 shows the Transmittance-Voltage (T-V) characteristic curve of a polymer enhanced STN LC device. The steepness of the T-V curve is determined by calculating the ratio of the applied voltage for 90 percent transmission to the applied voltage for 10 percent transmission. In this example, this ratio is around 1.15. The multiplexibility of the cell is up to ~50 lines. The higher the multiplexibility of a cell, the finer the pixel size of the display, and therefore, the higher the resolution of the cell. Primary applications for the polymer enhanced STN LC devices built on plastic (or rigid) substrates would include graphic or character dot-matrix displays in portable devices such as smart cards, cell phone, palmtop, and laptop devices.

In another example, a polymer columns enhanced twist nematic (TN) LC device was constructed as described above with the following exceptions. The cell gap was 4 microns (4 μm). The solution was E7 nematic liquid crystal and NOA65 prepolymer at a ratio of 90:10 by weight. A small amount (~0.1 weight percent) chiral material (S811) was added to the solution to induce the desired twist of the LC. The cell was filled with the solution at a temperature of 80° C. and then cooled to room temperature at a rate of −3° C. per minute. Then the cell was irradiated with UV light for 15 minutes for the polymerization of the prepolymer.

Figure 5A:
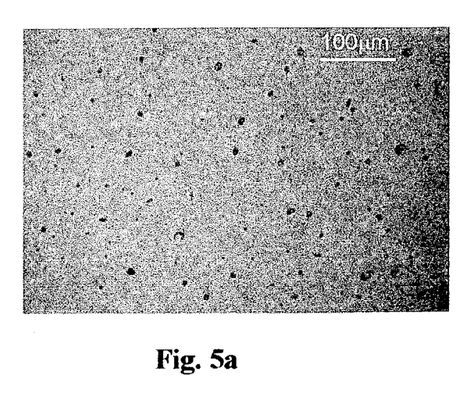
FIG. 5a is a micrograph of a polymer enhanced TN LC cell under crossed polarizers in a field-off state.
Figure 5B:
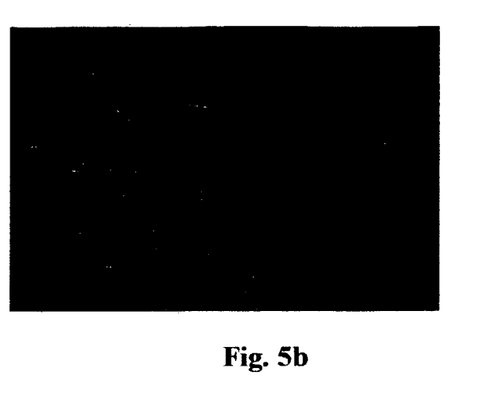
FIG. 5b is a micrograph of a polymer enhanced TN LC cell under crossed polarizers in a field-on state (3V).

FIG. 5a shows the microscopic texture of the TN LC cell with crossed polarizers and without an electric field applied. The black dots distributed throughout the texture are solidified polymer columns, which greatly improve the spacing control and mechanical ruggedness of the device. FIG. 5b shows the cell transferred to a dark state under an applied voltage of 3V.

Figure 6:
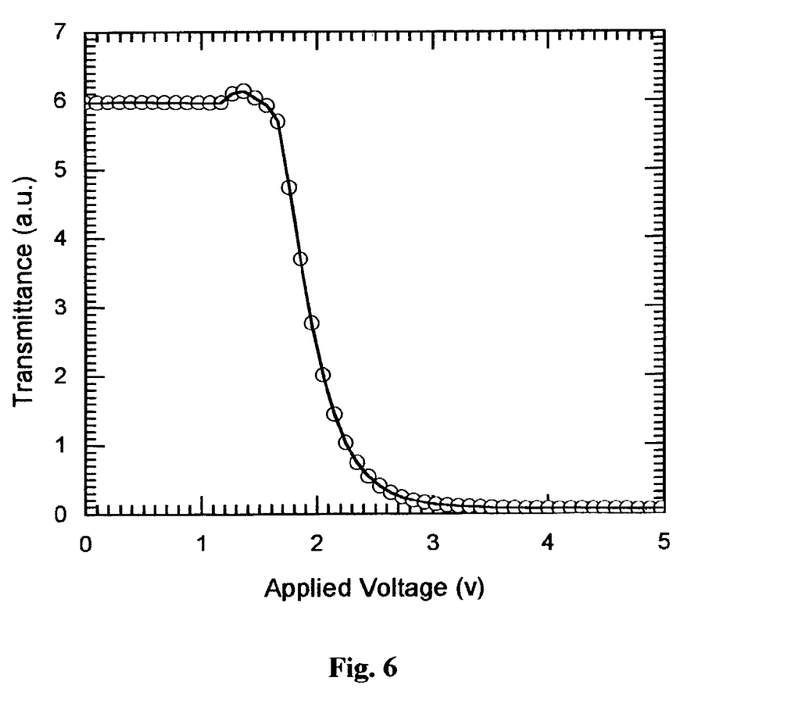
FIG. 6 is a transmittance-voltage dependence curve of a polymer enhanced TN LCD.

FIG. 6 shows the Transmittance-Voltage (T-V) characteristic curve of the polymer columns enhanced TN LC device. The Maximum contrast ratio is over 50:1. It also has the advantage of a low driving voltage character. The saturation voltage is less than 3V. It is envisioned that some of the primary applications for the polymer enhanced TN LC devices built on plastic substrates are in numerical segment or character passive matrix displays for smart cards, wristwatch applications, or to incorporate active matrix technology (ex. Thin-film-transistor, TFT) to realize the big size graphic dot-matrix displays in portable devices such as cell phones, palmtop devices, laptop computers, desktop monitors and high definition LC-TV's.

In another example, empty cells were constructed using indium-tin-oxide (ITO) coated glass substrates spin coated with polyimide KJ-01 (shown as formula I). The substrates were baked and rubbed according to methods known in the art. The rubbing directions of two substrates were set to form a left-handed twist angle of 200°. The cell gap was maintained at 5 mm with glass fiber spacers. As a standard, reference STN LC cell (sample A) was made with the conventional method using LC ZLI5400-100 and 0.6 weight percent chiral material S811 to facilitate a comparison of the present invention to prior LC devices.

The UV curable optical adhesive, NOA77 (Norland Products), was used as prepolymer. It was mixed with ZLI5400/100 nematic LC (Merck Inc.) in ratios of 7:93, 10:90 and 15:85 by weight prepolymer to LC to prepare samples B, C, and D, respectively. Left-handed chiral agent S811 (Merck Co.) was added (0.6 weight percent) to induce the desired twist. The solutions were well stirred at 80° C., 5° C. over the clear point of the LC. Then the solution was filled into empty cells at 80° C. by capillary action. At this temperature, liquid crystal and prepolymer formed a homogeneous, isotropic solution. The cells were cooled at a rate of 2° C./min using a Mettler FIP 82HT hot stage. When the temperature fell below 68° C., the isotropic solution sample B was observed under a polarizing microscope to phase separate into two regions of birefringent and predominantly nematic (LC rich) regions and isotropic (prepolymer rich) regions. The nematic phase domains kept growing with continuous phase separation of LC phase from out of the solution during the cooling process. By the time the cell reached room temperature (~25° C.), the micro-size polymer-rich droplets of isotropic prepolymer were uniformly dispersed in the aligned chiral nematic LC host. The cells were then treated with UV irradiation (~1mW/cm$^2$) for 10 min. The prepolymer droplets were polymerized and changed to solid polymer columns.

Figure 7A:
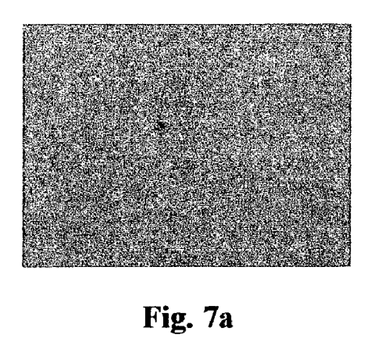
FIG. 7 is a series of micrographs of the texture of cells made from mixture formulations which contain chiral nematic liquid crystal ZLI5400/100 and (a) 0 percent polymer, (b) 7 weight percent of NOA77, (c) 10 weight percent NOA77 and (d) 15 weight percent NOA77.
Figure 7B:
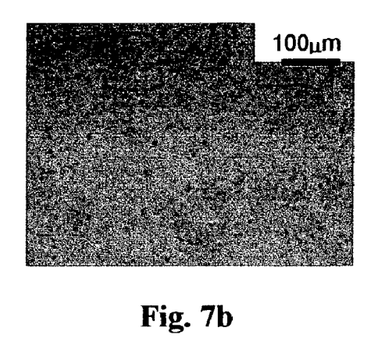
Figure 7C:
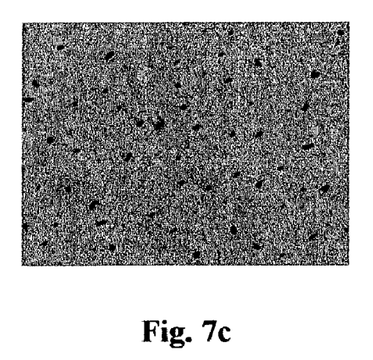
Figure 7D:
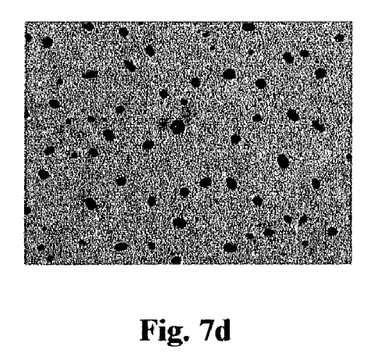

FIGS. 7b, 7c and 7d show the microscopic texture of the cells containing samples B, C, and D, respectively. As a reference, FIG. 7a shows the microscopic texture of a standard STN LC cell made with the conventional method using LC ZLI5400-100 and 0.6 weight percent chiral agent S811 without any prepolymer (sample A). The black dots dispersed in uniformly aligned LC, in FIGS. 7b, 7c and 7d, are polymer columns. The average size of these columns in the cell filled with sample B is ~5-10 μm. When the polymer content was increased to 15% (sample D) size of the polymer columns increased to around 20-30 μm. The presence of polymer columns didn't cause any disclination lines. LC was aligned uniformly even in the vicinity of polymer columns.

Figure 8:
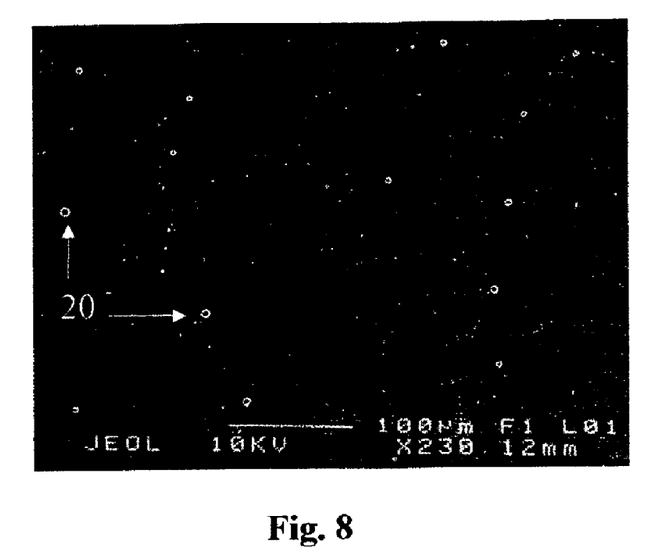
FIG. 8 is a Scanning Electron Microscope (SEM) micrograph of internal polymer columns formed in a polymer columns enhanced LCD cell.

The existence and profile of polymer columns was further investigated using scanning electron microscopy (SEM). To prepare samples for SEM, a cell made from the solution with sample B was opened. The substrates were rinsed with hexane for 3 minutes in order to remove the liquid crystal and then dried. A thin (~60 Å) overlayer of gold was deposited. FIG. 8 shows SEM images of the solidified polymer columns (20) attached to the substrate surface. The average size of those polymer columns is estimated to be ~5-10 microns. SEM results are consistent with the optical microscopic observations.

Figure 9:
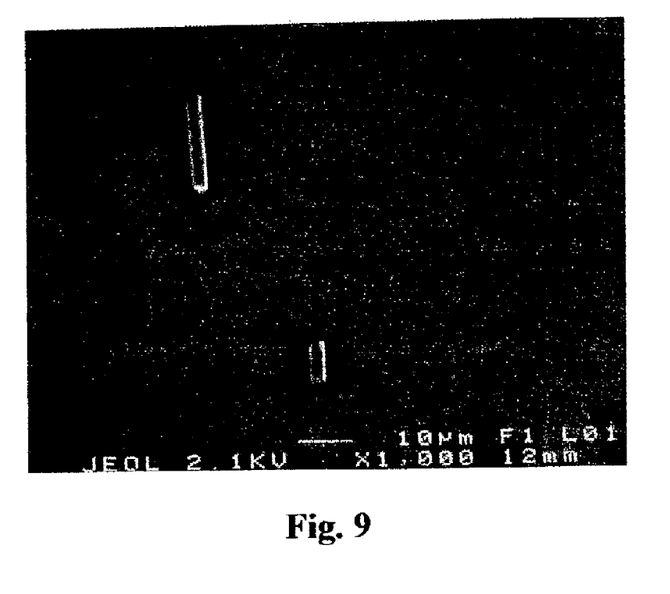
FIG. 9 is a Scanning Electron Microscope (SEM) micrograph of glass fiber spacers wrapped by internal polymer columns formed in a polymer columns enhanced LCD cell.

The SEM investigation also showed that some of polymer mass was localized by glass fiber spacers (FIG. 9). Spacers were found to be surrounded by polymer and bonded to the site of their initial position. Although not wishing to condition patentability on any particular theory, it is believed that this is because the phase separation process in these solutions is a nucleation and growth process along a binodal decomposition curve. There is an energy barrier against phase separation. It requires external energy to overcome the barrier to initiate the phase separation. The spacers and other singularities act as nucleation sites to initiate the phase separation. At a later stage, when enough prepolymer has separated near the spacers, the spacers are enveloped by the prepolymer due to the stronger interaction between glass fiber's surface and prepolymer molecules than between glass fibers and the liquid crystal. After the thermally induced phase separation is complete, subsequent UV irradiation of UV polymerizes the prepolymer and bonded the spacers to the two substrates. This structure provides the benefit of keeping the spacers from moving and maintaining the cell thickness when cell's gap temporally attempts to increase due to bending or other mechanical deformation of the cell. It is possible to control the density and distribution of spacers and polymer columns.

Figure 10:
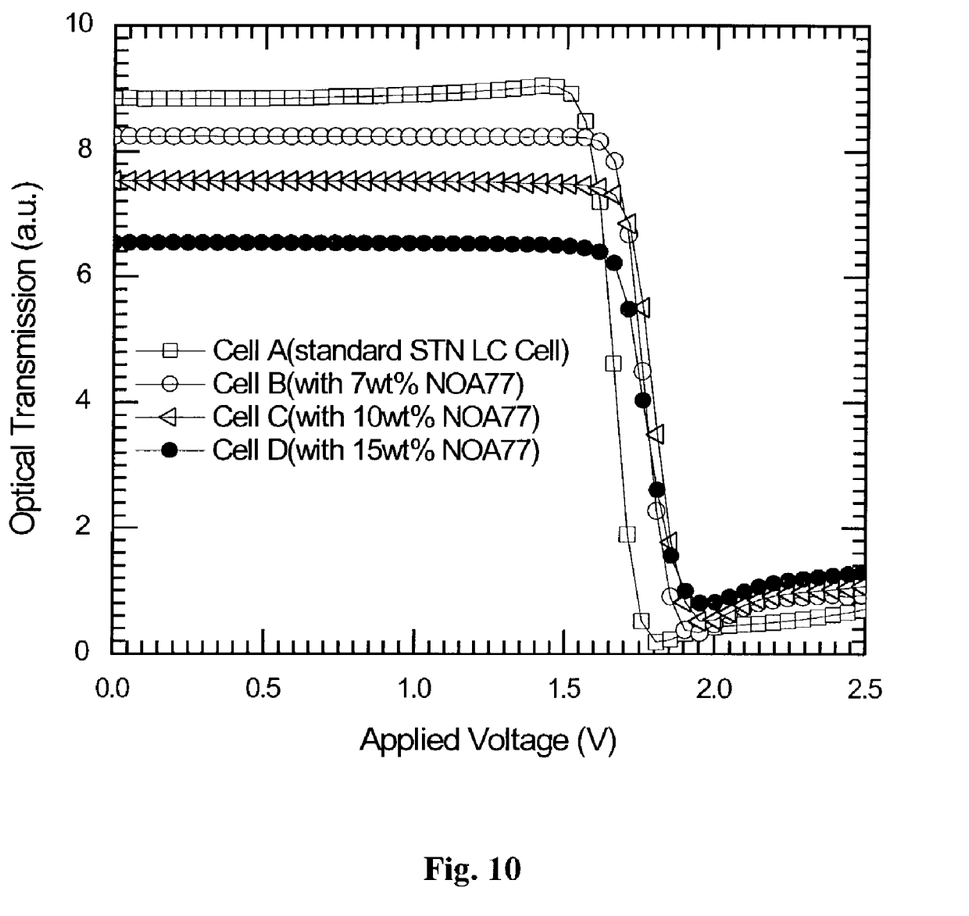
FIG. 10 is a graph of transmission vs. applied voltage for a standard STN cell A without polymer, and polymer columns STN cells made from mixture formulations which contain chiral nematic liquid crystal ZL15400/100 and varying percentages of NOA77.

FIG. 10 compares the voltage dependence of the optical transmission of a standard STN-LC cell A and three STN LC cells with polymer columns structures obtained using the three solutions B. C, and D. The twist angles are all 200° left-handed. All the sample cells with polymer columns structure exhibit reasonably good electro-optical response with steepness close to 1.1. The off state of the cells with polymer columns is less bright than standard cell A, and the higher the polymer content, the less bright the off state. Also optical leakage in the field-on state is higher than that of the standard cell. This is to be expected since polymer columns are optical isotropic, solid, and non-operable under the electrical field.

The comparison of the different cells in FIG. 10 also shows that the driving voltage of the cells increased by 0.2 volts compared to the standard cell A because of the presence of polymer columns. Furthermore, a fraction of the polymer formed tiny polymer beads (much smaller than cell's gap) or a network dispersed through out the LC. Those tiny polymer beads would require a noticeably smaller voltage drop to change their transmission significantly due to smaller dielectric constant of the polymer (for NOA77, $\epsilon_p$=3.3) compared to the LC ZLI5400-100 ($\epsilon_\perp$=9.9, $\epsilon_\parallel$=14.5, for 20° C., 1 KHz).

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention pertains.

Based upon the foregoing disclosure, it should now be apparent that the method of the present invention will provide LC devices in accordance with the objects set forth hereinabove. STN LC cells with polymer columns structure exhibit good electro-optical characteristics with a steepness of 1.1. This technique can be used for LC devices in other configurations, such as twist nematic (TN), electrically controlled birefringence (ECB), in-plane switching (IPS) and ferroelectrics LC (FLC). It is, therefore, to be understood that any variations evident fall within the scope of the claimed invention and thus, the selection of specific component elements can be determined without departing from the spirit of the invention herein disclosed and described.

We claim:

1. A liquid crystal device comprising:
a pair of opposed substrates, the opposing surfaces of the substrates defining a cell gap between the opposed substrates, each substrate having an electrode disposed on a surface facing the other substrate, the substrates being flexible substrates;
a plurality of spacers randomly disposed in the cell gap and extending from one substrate to the other substrate, wherein a polymerization enhancing or initiating compound is not disposed on the surface of the spacers;
polymer columns randomly disposed between the opposed substrates, extending from one substrate to the other substrate, at least a portion of which are disposed round the spacers and immobilizing the spacers in the cell gap; and
a liquid crystal material disposed in the cell gap;
wherein neither of the opposing surfaces of the substrates defining the cell gap between the opposed substrates is modified or patterned to control the locations of the polymer columns.

2. The liquid crystal device of claim 1, additionally comprising an alignment material disposed on at least one of the surfaces of the substrates which face the other substrate.

3. The liquid crystal device of claim 2, wherein the alignment material comprises side-chain or main-chain polar groups.

4. The liquid crystal device of claim 2, wherein the alignment material comprises non-polar material.

5. The liquid crystal device of claim 2, wherein the alignment material is a non-polar material and the liquid crystal material is non-polar.

6. The liquid crystal device of claim 2, wherein the alignment layer is a polar material and the liquid crystal material is a polar material.

7. The liquid crystal device of claim 1, wherein the spacers are selected from the group consisting of glass fibers and beads.

8. The liquid crystal device of claim 1, wherein the polymer columns immobilize the spacers in the cell gap to keep The spacers from moving and to maintain the cell thickness during bending or other deformation of The flexible substrates.

9. A liquid crystal device comprising:
a pair of opposed substrates, the opposing surfaces of the substrates defining a cell gap between the opposed substrates, each substrate having an electrode disposed on a surface facing the other substrate;
a liquid crystal material disposed in the cell gap, the liquid crystal material and a contacting layer of the pair of opposed substrates being one of polar and nonpolar;

a plurality of spacers randomly disposed in the cell gap and extending from one substrate to the other substrate; and polymer columns formed around the spacers and immobilizing the spacers in the cell gap, a prepolymer from which the polymer columns are formed being the other of polar and nonpolar;

wherein neither of the opposing surfaces of the substrates defining the cell gap between the opposed substrates is modified or patterned to control the locations of the polymer columns.

10. A liquid crystal device as set forth in claim 9, wherein the liquid crystal material and the contacting layer are polar, and the prepolymer is nonpolar.

11. A liquid crystal device as set forth in claim 10, wherein the spacers are made of a non-polar material.

12. A liquid crystal device as set forth in claim 10, wherein the spacers have a non-polar material layer disposed on their surfaces.

13. A liquid crystal device of claim 10, wherein the contacting layer comprises:

an alignment material disposed on at least one of the surfaces of the substrates which face the other substrate, the alignment material being polar.

14. A liquid crystal device as set forth in claim 9, wherein the liquid crystal material and the contacting layer are nonpolar, and the prepolymer is polar.

15. A liquid crystal device as set forth in claim 14, wherein the spacers are made of a polar material.

16. A liquid crystal device as set forth in claim 14, wherein the spacers have a polar material layer disposed on their surfaces.

17. A liquid crystal device of claim 14, wherein the contacting layer comprises:

an alignment material disposed on at least one of the surfaces of the substrates which face the other substrate, the alignment material being nonpolar.

18. A liquid crystal device as set forth in claim 9, wherein the pair of opposed substrates are flexible substrates, and the polymer columns immobilize the spacers in the cell gap to keep the spacers from moving and to maintain the cell thickness during bending or other deformation of the flexible substrates.

19. A liquid crystal device comprising:

a pair of opposed substrates, The opposing surfaces of the substrates defining a cell gap between the opposed substrates, each substrate having an electrode disposed on a surface facing the other substrate, neither of the opposing surfaces of the substrates defining the cell gap being patterned to control the locations of the polymer columns;

a plurality of spacers randomly disposed in the cell gap and extending from one substrate to the other substrate, wherein a polymerization enhancing or initiating compound is not disposed on the surface of the spacers;

polymer columns randomly disposed between the opposed substrates, extending from one substrate to the other substrate, at least a portion of which are disposed around the spacers and immobilizing the spacers in the cell gap; and a liquid crystal material disposed in the cell gap.

* * * * *